(12) United States Patent
LeViness et al.

(10) Patent No.: US 9,365,765 B2
(45) Date of Patent: Jun. 14, 2016

(54) GENERATION OF HYDROCARBON FUELS HAVING A REDUCED ENVIRONMENTAL IMPACT

(71) Applicant: Velocys, Inc., Plain City, OH (US)

(72) Inventors: Stephen Claude LeViness, Houston, TX (US); Ivan Greager, Wallingford (GB)

(73) Assignee: Velocys, Inc., Plain City, OH (US)

( * ) Notice: Subject to any disclaimer, the term of this patent is extended or adjusted under 35 U.S.C. 154(b) by 0 days.

(21) Appl. No.: 14/218,702

(22) Filed: Mar. 18, 2014

(65) Prior Publication Data

US 2014/0318794 A1    Oct. 30, 2014

Related U.S. Application Data

(60) Provisional application No. 61/801,983, filed on Mar. 15, 2013.

(51) Int. Cl.
*E21B 43/26* (2006.01)
*C09K 8/68* (2006.01)
*C09K 8/66* (2006.01)
*C10G 2/00* (2006.01)
*E21B 43/40* (2006.01)
*C02F 1/20* (2006.01)
*C02F 3/00* (2006.01)

(52) U.S. Cl.
CPC ... *C09K 8/68* (2013.01); *C09K 8/66* (2013.01); *C10G 2/32* (2013.01); *E21B 43/26* (2013.01); *E21B 43/40* (2013.01); *C02F 1/20* (2013.01); *C02F 3/00* (2013.01); *C10G 2300/1022* (2013.01)

(58) Field of Classification Search
CPC ............ E21B 43/40; C09K 8/68; C09K 8/66; C02F 1/20; C02F 3/00
USPC ................... 166/308.1, 307, 308.3
See application file for complete search history.

(56) References Cited

U.S. PATENT DOCUMENTS

| | | |
|---|---|---|
| 4,943,672 A | 7/1990 | Hamner et al. |
| 5,882,505 A | 3/1999 | Wittenbrink et al. |
| 6,013,171 A | 1/2000 | Cook et al. |
| 6,080,301 A | 6/2000 | Berlowitz et al. |
| 6,096,940 A | 8/2000 | Wittenbrink et al. |
| 6,103,099 A | 8/2000 | Wittenbrink et al. |
| 6,165,949 A | 12/2000 | Berlowitz et al. |
| 6,180,575 B1 | 1/2001 | Nipe |
| 6,533,945 B2 | 3/2003 | Shah |

(Continued)

FOREIGN PATENT DOCUMENTS

| | | |
|---|---|---|
| WO | 2005113426 A1 | 12/2005 |
| WO | 2007/068682 | 6/2007 |
| WO | WO 2012 107718 | 8/2012 |

OTHER PUBLICATIONS

Partial Search and Correspondence from the International Searching Authority in PCT Application No. PCT/US2014/031084 dated Jun. 23, 2014.

(Continued)

*Primary Examiner* — Doug Hutton, Jr.
*Assistant Examiner* — Silvana Runyan
(74) *Attorney, Agent, or Firm* — Frank Rosenberg (57) ABSTRACT

The Fischer-Tropsch (FT) process can be controlled to create water that has desirable characteristics for use in secondary processes such as fracking or irrigation.

16 Claims, 1 Drawing Sheet

(56) References Cited

U.S. PATENT DOCUMENTS

| | | | |
|---|---|---|---|
| 7,481,275 B2* | 1/2009 | Olsvik et al. | 166/303 |
| 7,971,643 B2 | 7/2011 | Brannon et al. | |
| 8,347,960 B2 | 1/2013 | Mothersbaugh et al. | |
| 8,424,784 B1* | 4/2013 | Munisteri | 241/3 |
| 8,720,725 B2 | 5/2014 | Abrams et al. | |
| 2005/0028979 A1* | 2/2005 | Brannon et al. | 166/280.2 |
| 2007/0066859 A1* | 3/2007 | Koper et al. | 585/467 |
| 2007/0087941 A1 | 4/2007 | Cawiezel | |
| 2010/0081726 A1* | 4/2010 | Tonkovich et al. | 518/700 |
| 2011/0092726 A1* | 4/2011 | Clarke | 554/175 |

OTHER PUBLICATIONS

Baliban, Richard C. et al., "Process synthesis of hybrid coal, biomass, and natural gas to liquids via Fischer-Tropsch synthesis, ZSM-5 catalytic conversion, methanol synthesis, methanol-to-gasoline, and methanol-to-olefins/distillate technologies", Computers and Chemical Engineering 47 (2012) 29-56.

Britz, T.J., et al. "Nitrogen and Phosphate Requirements for the Anaerobic Digestion of a Petrochemical Effluent", Wat. Res. vol. 22, No. 2, pp. 163-169, 1988.

Van Zyl, P.J., et al. "Design and start-up of a high rate anaerobic membrane bioreactor for the treatment of a low pH, high strength, dissolved organic waste water", Water Science & Technology—WST vol. 57.2 (2008).

Majone, Mauro, "High rate anaerobic treatment of Fischer-Tropsch wastewater in a packed-bed biofilm reactor", Water Research 44 (2010) 2745-2752.

* cited by examiner

GENERATION OF HYDROCARBON FUELS HAVING A REDUCED ENVIRONMENTAL IMPACT

RELATED APPLICATIONS

This application claims the benefit of U.S. Provisional Patent Application No. 61/801,983, file Mar. 15, 2013.

FIELD OF THE INVENTION

This invention relates to water created in the Fischer-Tropsch process and methods of reducing the environmental impact of hydraulic fracturing ("fracking").

INTRODUCTION

Fracking requires very large amounts of water, typically about 4 million gallons (15 million liters) of water are required for the development of each well. This very large volume of water at fracking sites can require over a thousand truck trips and/or substantial water pipelines from fresh water sources, which could include well water. This invention provides water that can be used for fracking or other valuable uses.

SUMMARY OF THE INVENTION

Rather than obtaining fresh water and transporting the fresh water to a fracking site, the invention creates water near the fracking site. The invention creates water in the Fischer-Tropsch reaction, $(2n+1)\ H_2 + nCO \rightarrow C_nH_{(2n+2)} + H_2O$. The Fischer-Tropsch ("FT") reaction can create very substantial amounts of water. For example, an FT process that makes 5000 barrels per day of liquid hydrocarbons creates about 250,000 gallons of water per day which can be stored in tanks near the fracking site. Thus, in a broad aspect, the invention provides method of fracking, comprising: creating water in a Fischer-Tropsch process to form created water; storing the created water in a location close to a fracking site; and injecting the created water in a well in a fracking process. Preferably, the FT process is conducted within one mile (1.6 km) or less of a fracking site.

Fuel sources for the FT process can be found near potential fracking sites or from fracking sites themselves. A problem with the FT process is that it creates water with high chemical oxygen demand (COD) that may need treatment prior to release. However, according to the present invention, water created in the FT process can be used directly for fracking without first passing the water through a water treatment facility. The FT process may be part of an integrated synthetic fuels facility which could use local sources of carbonaceous materials to produce synthesis gas. The carbonaceous materials may include natural gas, including shale gas, coal bed methane, natural gas liquids, oil, coal, bitumen, biogas, landfill gas, refuse, and combinations thereof. The conversion of carbonaceous fuels to synthesis gas may include steam reforming, autothermal reforming, partial oxidation, gasification, including underground coal gasification, and combinations thereof. The resulting synthesis gas is fed to a Fischer-Tropsch process, subsequent to any required gas clean-up processes required to meet synthesis gas feed specifications to the Fischer-Tropsch process. The Fischer-Tropsch process converts the synthesis gas to a mixture of water and hydrocarbons (primarily parrafinic, with some olefins and oxygenates). Fischer-Tropsch produced water is cleaner than many other sources of water from industrial facilities, since the FT reaction does not produce aromatics, halides, heavy metals, or some of the other waste water contaminants of concern.

In a first aspect, the invention provides a method of fracking, comprising: creating water in a Fischer-Tropsch (FT) process to form created water; storing the created water in a location close to a fracking site; and injecting the created water in a well at the fracking site. The meaning of "a location close to a fracking site" is the conventional understanding that the location is nearby so that the water can be injected into a well; this is routinely done for fracking operations. In some preferred embodiments, the FT process is conducted within 1.6 km of the fracking site.

In some preferred embodiments, a product stream from the FT process is separated into a first aqueous stream and a second aqueous stream; wherein the first aqueous stream contains a lower concentration of carbon than the second aqueous stream; and wherein water from the first aqueous stream is stored and injected into the well at the fracking site. In some preferred embodiments, either all the water recovered from an FT process or at least a portion of the first aqueous stream or at least a portion of the second aqueous stream is subjected to a stripping operation where a gas is passed through the first aqueous stream. In some embodiments, at least a portion of the second aqueous stream is reacted in a steam reforming reaction or an autothermal reforming reaction.

Preferably, the FT process is conducted in the presence of a FT catalyst at a contact time of less than 1 second. Also, preferably, the FT process is conducted in a microchannel. In some preferred embodiments, the created water that is injected into the well has a concentration of methanol that is more than 10 times greater than any other alcohol. In many cases, a low pH is desirable for a fracking operation; however, in some embodiments, a base is added to the created water either for fracking or for other uses such as irrigation or as drinking water. For fracking it is typically desirable to add particulates to the created water prior to injecting the created water in the well at the fracking site.

The invention also provides a useful created water composition, comprising: at least 90% water; less than 20 mg/L, or 10 mg/L, of each of the following: formaldehyde, propionaldehyde, butyraldehyde, diethyl ketone; at least 10 mg/L of each of the following: formic acid, acetic acid, propionic acid, n-butryic acid, and n-valeric acid; and at least 50 mg/L methanol wherein the mass ratio of methanol to the sum of (propanol+butanol+pentanol+hexanol+heptanol+octanol+nonanol) is greater than 1, or greater than 2 or greater than 5 or greater than 10 or greater than 50. In some preferred embodiments, the water composition may possess one or any combination of the following characteristics: 10 ppm or less aromatics; pH between 3.0 and 3.5; 40 mg/L, 20 mg/L, 10 mg/L, 5 mg/L or less acetone; 50 to 8000 mg/L methanol or 50 to 4000 mg/L methanol; up to about 3500, or up to about 1000, or up to about 500 mg/L ethanol; a mass ratio of formic acid to methanol at least 0.030, or at least 0.08; a mass ratio of propionic acid to propanol at least 0.030, or at least 0.06, or at least 1.0; a $^{14}C/^{13}C$ ratio is at least 90% lower than present in biological carbon (this identifies the carbon as a fossil fuel source); 0.1 to 1.0% C; less than 1.0 mg/L of each of the following: formaldehyde, propionaldehyde, butyraldehyde, diethyl ketone; less than 0.1 mg/L of each of the following: formaldehyde, propionaldehyde, butyraldehyde, and diethyl ketone. The water is useful for fracking, irrigation, and with additional treatment, drinking water.

The invention also includes methods of treating water created in the FT process. Thus, in one aspect, the invention provides a method of treating water created in a FT process, comprising: conducting an FT process to form a product stream; separating the product stream into an aqueous stream and a hydrocarbon product stream; subjecting the aqueous stream to a stripping operation where a gas is passed through the aqueous stream and thereby producing a stripped aqueous stream; and using the stripped aqueous stream in a secondary process comprising fracking or irrigation. In one embodiment, the product stream is separated into a first aqueous stream and a second aqueous stream; wherein the first aqueous stream contains a lower concentration of carbon than the second aqueous stream; subjecting at least a portion of the first aqueous stream to a stripping operation where a gas is passed through the first aqueous stream and thereby producing a first stripped stream; using the stripped stream in a secondary process; and passing the second aqueous stream to a waste treatment facility. In an alternative embodiment, the second aqueous stream is subjected to a stripping operation where a gas is passed through the second aqueous stream and thereby producing a second stripped stream.

In describing the stripping step(s), the term "gas" does not distinguish between gases and vapors; thus steam is included in the classification of a "gas". In some preferred embodiments, the stripping gas comprises steam, air, N2, tail gas, natural gas, and combinations thereof. Any of the aqueous streams may be further treated in a waste treatment facility, preferably using a biological treatment to remove contaminants.

In some preferred embodiments, a product stream from an FT process is passed through a first condenser forming a first aqueous stream, a first hydrocarbon stream, and a vapor stream. This vapor stream can then be passed into a second condenser to recover a second aqueous stream. The first aqueous stream has a significantly lower carbon content and may be more suitable for fracking than the second aqueous stream. The first aqueous stream may also be recycled for use in the step to convert the carbonaceous materials to synthesis gas. A portion of this first aqueous stream that is not used for fracking and/or recycle to the process may be sent to a water treatment system. Preferably, the first aqueous stream comprises 0.01 to 1% carbon, in some embodiments 0.1 to 0.7%, in some embodiments 0.2 to 0.5% carbon (% is mass % unless indicated otherwise). In some preferred embodiments, the second aqueous stream comprises 0.5 to 10% carbon, in some embodiments 1 to 5%, in some embodiments 2 to 4%. In some embodiments, the first aqueous stream comprises 50 to 95% of the water produced in the FT process, in some embodiments at least 60%, in some embodiments at least 70%, and in some embodiments at least 80%. The second aqueous stream comprises 5 to 30% of the water produced in the FT process, in some embodiments 20% or less, in some embodiments 15% or less of the water produced in the FT process. In some preferred embodiments, at least 50%, at least 60%, at least 70%, or at least 80% and up to 95% or up to 90% of the water recovered from the FT process is injected in a well (or wells) in a fracking operation (or operations).

The first aqueous stream (or alternatively stated, a relatively higher boiling (or more easily condensable) fraction which may comprise 50 to 95% of the water produced in the FT process, in some embodiments at least 60%, in some embodiments at least 70%, and in some embodiments at least 80% of the water produced in the FT process) comprises alcohols that can improve the fracking process and relatively little hydrocarbons (non-alcohols). The carbon compounds in the second aqueous stream (or alternatively stated, a relatively lower boiling (or less easily condensable) fraction have a lower mass ratio of alcohol to hydrocarbons. In some preferred embodiments, the first aqueous stream is stored for fracking and the second aqueous stream is sent to a water treatment facility.

Any of the method steps discussed in this specification can be incorporated into the method of fracking discussed above.

Stripping

In some preferred aspects of the invention, some or all of the water created in the FT process is subjected to a stripping operation. In some preferred aspects, the stripper pressure is slightly above atmospheric pressure and the temperature of the mixture at any point in the column will be at the mixture bubble point. In some preferred aspects, the stripping can be done by flowing the FT water down a column with packing or trays, with the stripping fluid (e.g. steam) in counter-current contact. The stripping may be done under vacuum or slightly above atmospheric pressure (for example, 0.1-10 atm). The temperature will be below the boiling temperature of the FT water. The mass ratio of stripping medium to FT water may be 0.001 to 0.5, more preferably 0.01 to 0.2.

Water created in an FT process conducted at contact times of 1 second or less and/or short diffusion distances (e.g. FT catalyst thickness of 100 μm or less) and/or an FT process conducted under the conditions described below) is superior to water created by conventional FT or many other industrial waste water compositions. Advantages of the created water obtained as described herein may include one or more of the following features: very low concentration of aromatics (e.g., 10 ppm or less); low aldehyde concentration, and wherein the carbon present in the water is nearly exclusively (e.g., at least 90% by mass, or at least 95% by mass, or at least 98% by mass, or lat least 99% by mass) in the form of biodegradable acids (i.e., formic, acetic, propionic, n-butyric, n-valeric, and caproic), methanol, or ethanol.

The invention also includes a storage tank or basin near a fracking site that comprises the water composition described here. Likewise, the invention includes a method of using the water composition in fracking or irrigation.

Shown below is a table listing the composition of water created by a FT process as described herein and results from a modeling simulation after stripping with steam at 5, 10, or 15% of the feed water mass flow.

| | | Data source | | | | | | |
|---|---|---|---|---|---|---|---|---|
| | | Bench-scale sample | | | | Pilot-scale sample | | |
| | | | Stripped water | | | | Stripped water | | |
| | | Feed | 5% steam | 10% steam | 15% steam | Feed | 5% steam | 10% steam | 15% steam |
| General | | | | | | | | | |
| pH | | 3.18 | | | | 3.29 | | | |
| Ketones | | | | | | | | | |
| Acetone | mg/l | 35.9 | 14.2 | 0.0 | 0.0 | 52.3 | 17.5 | 0.0 | 0.0 |
| Diethyl Ketone | mg/l | 0.161 | 0.0 | 0.0 | 0.0 | 0.181 | 0.0 | 0.0 | 0.0 |

-continued

| | | Data source | | | | | | | |
|---|---|---|---|---|---|---|---|---|---|
| | | Bench-scale sample | | | | Pilot-scale sample | | | |
| | | | Stripped water | | | | Stripped water | | |
| | | Feed | 5% steam | 10% steam | 15% steam | Feed | 5% steam | 10% steam | 15% steam |
| Aldehydes | | | | | | | | | |
| Formaldehyde | mg/l | 0.13 | 0.0 | 0.0 | 0.0 | Not detected | 0.0 | 0.0 | 0.0 |
| Acetaldehyde | mg/l | 26.1 | 0.0 | 0.0 | 0.0 | <10 | 0.0 | 0.0 | 0.0 |
| Propionaldehyde | mg/l | <10 | 0.0 | 0.0 | 0.0 | <10 | 0.0 | 0.0 | 0.0 |
| Butyraldehyde | mg/l | <10 | 0.0 | 0.0 | 0.0 | <10 | 0.0 | 0.0 | 0.0 |
| Acids | | | | | | | | | |
| Formic Acid | mg/l | 127 | 125.0 | 123.7 | 122.2 | 108 | 105.8 | 104.8 | 103.6 |
| Acetic Acid | mg/l | 270 | 259.5 | 256.6 | 252.9 | 261 | 250.0 | 247.3 | 244.1 |
| Propionic Acid | mg/l | 26.6 | 28.7 | 27.8 | 26.8 | 20.4 | 19.1 | 18.6 | 17.9 |
| n-Butyric Acid | mg/l | 21.7 | 19.0 | 17.9 | 16.6 | 22.8 | 19.0 | 17.9 | 16.7 |
| n-Valeric Acid | mg/l | 19.9 | 19.0 | 17.9 | 16.6 | 23.8 | 19.0 | 18.0 | 16.8 |
| Caproic Acid | mg/l | 11.9 | 9.5 | 9.0 | 8.5 | 19.4 | 19.1 | 18.1 | 17.1 |
| Alcohols | | | | | | | | | |
| Methanol | mg/l | 3900 | 3349.3 | 1583.5 | 98.5 | 7780 | 6661.6 | 3232.0 | 227.5 |
| Ethanol | mg/l | 3310 | 2673.0 | 449.8 | 0.7 | 2450 | 1969.5 | 371.2 | 0.6 |
| Propanol | mg/l | 980 | 460.8 | 0.0 | 0.0 | 690 | 329.5 | 0.0 | 0.0 |
| Butanol | mg/l | 622 | 459.7 | 6.2 | 0.0 | 446 | 318.0 | 0.0 | 0.0 |
| Pentanol | mg/l | 307 | 230.0 | 2.7 | 0.0 | 251 | 184.8 | 0.0 | 0.0 |
| Hexanol | mg/l | 102 | 67.7 | 0.1 | 0.0 | 94.2 | 61.2 | 0.0 | 0.0 |
| Heptanol | mg/l | 26.3 | 20.0 | 0.0 | 0.0 | 28 | 20.2 | 0.0 | 0.0 |
| Octanol | mg/l | 8.9 | 0.0 | 0.0 | 0.0 | 10.2 | 0.0 | 0.0 | 0.0 |
| Nonanol | mg/l | 5 | 6.7 | 0.0 | 0.0 | 5.2 | 6.8 | 0.0 | 0.0 |
| Decanol | mg/l | 5.6 | 6.6 | 0.0 | 0.0 | 5.4 | 6.7 | 0.0 | 0.0 |

FT processes that are conducted in microchannels comprising an FT catalyst and/or at short contact times with an FT catalyst are especially desirable since such processes result in a superior mix of components as compared to conventional FT processes. For purposes of the present invention, a microchannel is defined as a channel having at least one internal dimension of 10 mm or less; in some preferred embodiments 5 mm or less. In preferred embodiments, the FT reaction is conducted through a planar array of microchannels that are adjacent to a planar array of coolant channels. Short contact times are preferably less than 1 second, more preferably less than 500 msec, and in some embodiments in the range of 150 to 500 ms.

Water created by the preferred FT methods mentioned in this disclosure are believed to be superior because the process makes lower amounts of alcohols in total (relative to conventional FT processes), and more specifically the low amounts in the larger hot separator water stream (normally in the range of 0.2-0.5%). Alcohols are a common additive to water employed for fracking but the amounts are generally low.

In some preferred embodiments, a fracking process is conducted using water created from an FT process conducted in microchannels comprising an FT catalyst and/or at short contact times with an FT catalyst, or, optionally using any one or any combination of the FT process conditions and/or system characteristics, such as catalyst size and/or composition, optionally in combination with other selected process conditions. In some preferred embodiments, the invention comprises conducting fracking using created water having a carbon content of 1% or less, in some embodiments 0.7% or less, and in some embodiments 0.5% or less, in some embodiments in the range of 0.1 to 1%, in some embodiments 0.3% or less.

The lower levels of alcohols generated in the FT processes mentioned herein are believed to occur, especially when the process is run at very high reaction rates (short contact times) and, preferably, with moderately sized catalyst particles, and as a result, operate with a significant amount of mass transfer limitations—specifically catalyst pore diffusion limitations.

The mass transfer coefficient for CO is a lot smaller than the one for $H_2$, so when mass transfer limitations become significant CO is affected primarily. The local $H_2/CO$ (inside catalyst pellets) increases, even as the concentrations of both decrease. Increasing $H_2/CO$ ratio increases the extent of hydrogenation of the products, meaning less olefins and alcohols and more paraffins.

It can also be noted that FT water is also acidic (both the first and second separated streams) and tends to have a pH in the range of 3.0-3.5. Mineral acids are a common ingredient of fracking fluids.

Prior to use in fracking, the created water may be modified by adding one or more of the following: a particulate (such as sand or other particulates), a thickener (such as guar gum or a polysaccharide), a clay stabilizer (such as sodium chloride or an ammonium salt), and a scale inhibitor (such as a phosphonic acid).

GLOSSARY

The term "microchannel" may refer to a channel having at least one internal dimension of height or width of up to about 10 millimeters (mm), and in one embodiment up to about 5 mm, and in one embodiment up to about 2 mm, and in one embodiment up to about 1 mm. The microchannel may comprise at least one inlet and at least one outlet wherein the at least one inlet is distinct from the at least one outlet. The microchannel may not be merely an orifice. The microchannel may not be merely a channel through a zeolite or a mesoporous material. The length of the microchannel may be at least about two times the height or width, and in one embodiment at least about five times the height or width, and in one embodiment at least about ten times the height or width. The internal height or width of the microchannel may be in the range of about 0.05 to about 10 mm, and in one embodiment from about 0.05 to about 5 mm, and in one embodiment from about 0.05 to about 2 mm, and in one embodiment from about 0.05 to about 1.5 mm, and in one embodiment from about 0.05 to about 1 mm, and in one embodiment from about 0.05 to about 0.75 mm, and in one embodiment from about 0.05 to about 0.5 mm. The other internal dimension of height or width may be of any dimension, for example, up to about 3 meters, and in one embodiment about 0.01 to about 3 meters, and in one embodiment about 0.1 to about 3 meters. The length of the microchannel may be of any dimension, for example, up to about 10 meters, and in one embodiment from about 0.1 to about 10 meters, and in one embodiment from about 0.2 to about 10 meters, and in one embodiment from about 0.2 to about 6 meters, and in one embodiment from 0.2 to about 3 meters. The microchannel may have a cross section having any shape, for example, a square, rectangle, circle, semi-circle, trapezoid, etc. The shape and/or size of the cross section of the microchannel may vary over its length. For example, the height or width may taper from a relatively large dimension to a relatively small dimension, or vice versa, over the length of the microchannel.

The term "microchannel reactor" may refer to an apparatus comprising one or more process microchannels wherein an FT process is conducted. When two or more process microchannels are used, the process microchannels may be operated in parallel. The microchannel reactor may include a header or manifold assembly for providing for the flow of fluid into the one or more process microchannels, and a footer or manifold assembly providing for the flow of fluid out of the one or more process microchannels. The microchannel reactor may comprise one or more heat exchange channels adjacent to and/or in thermal contact with the one or more process microchannels. The heat exchange channels provide heating and/or cooling for the fluids in the process microchannels. The microchannel reactor may include a header or manifold assembly for providing for the flow of heat exchange fluid into the heat exchange channels, and a footer or manifold assembly providing for the flow of heat exchange fluid out of the heat exchange channels.

The term "process microchannel" may refer to a microchannel wherein an FT process is conducted.

The term "contact time" refers to the volume of a reaction zone within a microchannel divided by the volumetric feed flow rate of the reactants at a temperature of 0° C. and a pressure of one atmosphere.

The term "fresh synthesis gas" refers to synthesis gas that flows into a microchannel reactor and is used as a reactant in a Fischer-Tropsch reaction. The fresh synthesis gas does not contain any recycled components from the product produced during the Fischer-Tropsch reaction. The term "fresh synthesis gas" refers to a gaseous mixture that contains CO and $H_2$ and is not part of the recycled tail gas that is used during the inventive process. Synthesis gas may be referred to as syngas. The fresh synthesis gas can be combined with recycled tail gas, which also contains $H_2$ and CO, to form the reactant mixture used with the FT process. The reactant mixture may comprise $H_2$ and CO with a molar ratio of $H_2$ to CO that may be in the range from about 1.4:1 to about 2.1:1, or from about 1.5:1 to about 2:1:1, or from about 1.6:1 to about 2:1, or from about 1.7:1 to about 1.9:1. The fresh synthesis gas may comprise $H_2$ and CO with the molar ratio of $H_2$ to CO being in the range from about 1.9:1 to about 2.1:1, or from about 1.95:1 to about 2.05:1, or from about 1.98:1 to about 2.02:1. The tail gas that is generated during the FT process and combined with the fresh synthesis gas to form the reactant mixture may be referred to as recycled tail gas. The recycled tail gas may comprise $H_2$ and CO with a molar ratio of $H_2$ to CO in the range from about 0.5:1 to about 2:1, or from about 0.6:1 to about 1.8:1, or from about 0.7:1 to about 1.2:1. The volumetric ratio of the fresh synthesis gas to the tail gas in the reactant mixture may be in the range from about 1:1 to about 10:1, or from about 1:1 to about 8:1, or from about 1:1 to about 6:1, or from about 1:1 to about 4:1, or from about 3:2 to about 7:3, or about 2:1.

The term "tail gas" refers to a gaseous product produced during a Fisher-Tropsch reaction. The tail gas may contain CO and $H_2$.

The term "reactant mixture" refers to a mixture of fresh synthesis gas, and a tail gas or tail gas components (e.g., CO and $H_2$) recycled from the Fischer-Tropsch reaction.

The term "conversion of CO" refers to the CO mole change between the fresh synthesis gas in the reactant mixture and product, divided by the moles of CO in the fresh synthesis gas.

The term "one-pass conversion of CO" refers to the conversion of CO from the overall reactant mixtures (i.e., fresh synthesis gas plus recycled tail gas or recycled tail gas components) after one pass through the microchannel reactor.

The term "selectivity to methane" refers to the moles of methane in the product minus the moles of methane in the reactant mixture, divided by moles of the CO that are consumed in the reaction.

The term "Fischer-Tropsch product" or "FT product" refers to a hydrocarbon product made by a Fischer-Tropsch process. The FT liquid product may have a boiling point at or above about 30° C. at atmospheric pressure.

The term "FT tail gas" or "tail gas" refers to a gaseous product made by a Fischer-Tropsch process. The tail gas may have a boiling point below about 30° C. at atmospheric pressure. The tail gas may contain $H_2$ and CO.

The term "Co loading" may refer to the weight of Co in a catalyst divided by the total weight of the catalyst, that is, the total weight of the Co plus any co-catalyst or promoter as well as any support. If the catalyst is supported on an engineered support structure such as a foam, felt, wad or fin, the weight of such engineered support structure may not be included in the calculation. Similarly, if the catalyst is adhered to a channel wall, the weight of the channel wall may is not be included in the calculation.

The Fischer-Tröpsch Process

Examples of Fischer-Tröpsch processes suitable for use in the present invention are described in US Published Patent Application No. 20100081726 and WO2012107718 which are incorporated herein by reference. The following are some non-limiting descriptions of some preferred embodiments of the FT process that can be used for creating water in conjunction with the present invention:

Suitable apparatus for conducting the FT process is known in the prior art. Preferred apparatus are microchannel reactors. A microchannel reactor may be made of any material that provides sufficient strength, dimensional stability and heat transfer characteristics to permit operation of the desired process. These materials may include aluminum; titanium;

nickel; platinum; rhodium; copper; chromium; alloys of any of the foregoing metals; brass; steel (e.g., stainless steel); quartz; silicon; or a combination of two or more thereof. Each microchannel reactor may be constructed of stainless steel with one or more copper or aluminum waveforms being used for forming the channels. In preferred embodiments, the FT reactor is not a fluidized bed reactor.

The microchannel reactor may comprise a plurality of plates or shims in a stack defining a plurality of Fischer-Tropsch process layers and a plurality of heat exchange layers, each plate or shim having a peripheral edge, the peripheral edge of each plate or shim being welded to the peripheral edge of the next adjacent plate or shim to provide a perimeter seal for the stack. This is shown in U.S. Published Patent Application No. 2012/0095268, which is incorporated herein by reference.

The microchannel reactor may be constructed using waveforms in the form of corrugated inserts. These corrugated sheets may have corrugations with right-angles and may have rounded edges rather than sharp edges. These inserts may be sandwiched between opposing planar sheets or shims. In this manner the microchannels may be defined on three sides by the corrugated insert and on the fourth side by one of the planar sheets. The process microchannels as well as the heat exchange channels may be formed in this manner. Microchannel reactors made using waveforms are disclosed in U.S. Pat. No. 8,720,725, which is incorporated herein by reference.

The FT microchannel reactor may comprise at least one process microchannel in thermal contact with a heat exchanger, the catalyst being in the process microchannel. The microchannel reactor may comprise a plurality of process microchannels and a plurality of heat exchange channels, the catalyst being in the process microchannels.

The microchannel reactor may comprise a plurality of process microchannels and a plurality of heat exchange channels, the catalyst being in the process microchannels, each heat exchange channel being in thermal contact with at least one process microchannel, at least one manifold for flowing the reactant mixture into the process microchannels, at least one manifold for flowing product out of the process microchannels, at least one manifold for flowing a heat exchange fluid into the heat exchange channels, and at least one manifold for flowing the heat exchange fluid out of the heat exchange channels.

A plurality of the microchannel reactors may be positioned in a vessel, each microchannel reactor comprising a plurality of process microchannels and a plurality of heat exchange channels, the catalyst being in the process microchannels, each heat exchange channel being in thermal contact with at least one process microchannel, the vessel being equipped with a manifold for flowing the reactant mixture to the process microchannels, a manifold for flowing the product from the process microchannels, a manifold for flowing a heat exchange fluid to the heat exchange channels, and a manifold for flowing the heat exchange fluid from the heat exchange channels. The process microchannel having fluid flowing in it in one direction, the heat exchange channel having fluid flow in a direction that is co-current, counter-current or cross-current to the flow of fluid in the process microchannel.

The microchannel reactor may comprise at least one process microchannel and at least one heat exchanger, a tailored heat exchange profile being provided along the length of the process microchannel, the local release of heat given off by the reaction conducted in the process microchannel being matched with cooling provided by the heat exchanger.

The microchannel reactor may comprise a plurality of process microchannels, the process microchannels being formed by positioning a waveform between planar sheets. The microchannel reactor may further comprises a plurality of heat exchange channels in thermal contact with the process microchannels, the heat exchange channels being formed by positioning a waveform between planar sheets.

The catalyst may be in the form of particulate solids. The microchannel reactor comprises one or more process microchannels, and the catalyst may be coated on interior walls of the process microchannels or grown on interior walls of the process microchannels. The catalyst may be supported on a support having a flow-by configuration, a flow-through configuration, or a serpentine configuration. The catalyst may be supported on a support having the configuration of a foam, felt, wad, fin, or a combination of two or more thereof.

In preferred aspects, the catalyst can be disposed on a support that comprises a refractory metal oxide, carbide, carbon, nitride, or mixture of two or more of these. The support may comprise alumina, zirconia, silica, titania, or a mixture of two or more of these. The support may comprise a $TiO_2$ modified silica support wherein the support contains at least about 5% by weight $TiO_2$, or from about 5% to about 30% by weight $TiO_2$, or from about 1 to about 17% by weight $TiO_2$, or about 16% by weight $TiO_2$. The surface of the surface modified support may be amorphous. A catalyst precursor may comprise a cobalt oxide, such as $Co_3O_4$.

The preferred FT catalyst comprises Co and preferably comprises at least one secondary catalyst metal. Suitable secondary catalyst metals may include noble metals, such as Pd, Pt, Rh, Ru, Ir, Au, Ag and Os, transition metals, such as Zr, Ti, V, Cr, Mn, Fe, Co, Ni, Cu, Zn, Nb, Mo, Tc, Cd, Hf, Ta, W, Re, Hg and Ti and the 4f-block lanthanides, such as La, Ce, Pr, Nd, Pm, Sm, Eu, Gd, Tb, Dy, Ho, Er, Tm, Yb and/or Lu.

The secondary catalyst metal may be one or more of Pd, Pt, Ru, Ni, Co (if not the primary catalyst metal), Fe (if not the primary catalyst metal), Cu, Mn, Mo, Re and W.

The catalyst may be dispersed on a surface modified support to anchor the catalyst particles and provide mechanical strength. The support may comprise a refractory metal oxide, carbide, carbon, nitride, or mixture of two or more thereof. The support may comprise alumina, zirconia, silica, titania, or a mixture of two or more thereof. The surface of the support may be modified by treating it with titania, zirconia, magnesia, chromia, silica, alumina, or a mixture of two or more thereof. The material used for the support and the material used for modifying the support may be different. While not wishing to be bound by theory, it is believed that the surface treatment provided for herein helps keep the Co from sintering during operation of the inventive Fischer-Tropsch process.

The support may comprise silica and the surface of the silica may be coated with an oxide refractory solid oxide, in particular titania. The catalyst support may be in the form of a structured shape, pellets or a powder.

The support may comprise a titania modified silica support. Titania ($TiO_2$) may be used to increase the stability (e.g. by decreasing deactivation) of the silica-supported catalyst.

At elevated temperatures, the catalyst material may react with the surface Si—OH groups on a silica support to generate silicate species which are not Fischer-Tropsch active and may not be readily reducible. This may lead to a loss in active surface area of the catalyst and therefore a drop in Fischer-Tropsch synthesis activity.

Without wishing to be bound by theory, it is believed that dispersion of titania onto a silica surface occurs via consumption of the surface Si—OH groups with the subsequent forming of bridging Ti—O—Si bonds. Thus, modification of a silica support with a layer of titania may remove the Si—OH groups and thereby prevent the formation of silicates.

$TiO_2$ may comprise at least 11 wt %, or greater than 11 wt %, of the total weight of the catalyst support. In particular, the catalyst support may comprise 11-30 wt %, 11-25 wt %, 11-20 wt %, or 12-18 wt %, or 15-17 wt %, or about 16 wt % $TiO_2$ on silica ($SiO_2$).

In one embodiment, the catalyst precursor may comprise from about 40 to about 44 wt % Co, from about 0.1 to about 0.3 wt % Re, and from about 0.01 to about 0.05 wt % Pt (each expressed as a percentage of the total weight of the catalyst precursor); and a $TiO_2$-modified silica catalyst support, comprising from about 11 to about 30 wt % $TiO_2$ (expressed as a percentage of the total weight of the catalyst support).

The activity and the selectivity of cobalt-based catalysts may be influenced by the density of active sites, favouring very small particle sizes. However, the deactivation mechanisms of cobalt catalysts may follow in general the reverse trend, where the largest particles may be the most stable.

The numerical average particle diameter of $Co_3O_4$ may be less than about 12 nm (determined by powder X-ray diffraction, for example, using a Siemens D5000 theta/theta powder diffractometer and $CuK_\alpha$ radiation). The cobalt oxide particle size distribution may influence catalyst activity and stability, such that, a particle size distribution as narrow as possible may be useful. The width of the particle size distribution can be measured by the c value of the log normal particle size distribution. c is a dimensionless ratio, and characterizes the width of the size distribution. The c value of the log normal particle size distribution of $Co_3O_4$ particles may be less than about 0.31. The average particle diameter of $Co_3O_4$ may be below about 11 nm, or between about 8 and about 10 nm. The c value may be between about 0.19 and about 0.31, or below about 0.25, or between about 0.19 and about 0.25. Where the numerical average particle diameter of the $Co_3O_4$ is in the range of about 8 to about 10 nm, c may be less than 0.31.

The characteristics of the $Co_3O_4$ particles may be affected by the synthetic procedure by which the catalyst precursor and catalyst are produced.

In particular, where the catalyst comprises a $TiO_2$-modified silica support, the use of a titanium alkoxide (e.g. titanium isopropoxide) to modify the support can provide a catalyst comprising $Co_3O_4$ having the above properties. In this embodiment, the catalyst precursor may contain less than 10%, or less than 5%, or preferably less than 1% crystalline $TiO_2$ (expressed as a percentage of all of the $TiO_2$ in the catalyst precursor). Alternatively, all of the $TiO_2$ present in the catalyst precursor may be amorphous or not crystalline (up to detectable limits).

Alternatively, where the catalyst comprises a $TiO_2$-modified silica support, an aqueous method (e.g. using titanium (IV) bis(ammoniumlactato)dihydroxide) may be used to modify the support in place of using a titanium alkoxide. A preferred aqueous method is as described in the section headed "Aqueous Treating of Catalyst Support" below. The resulting modified support is also able to provide a catalyst comprising $Co_3O_4$ having the above properties.

Similarly, the use of citric acid as fuel/reducing agent in the production of the catalyst precursor can provide a catalyst precursor and a catalyst comprising $Co_3O_4$ having the above properties.

Also, the number of impregnations used to form a catalyst may affect the particle size distribution.

The catalyst may be supported on a flow-through support structure such as a foam, wad, pellet, powder, or gauze. The flow-through catalyst is contained within a process microchannel, the reactants flowing through the catalyst.

The support structure for a flow-through catalyst may be formed from a material comprising silica gel, foamed copper, sintered stainless steel fiber, steel wool, alumina, or a combination of two or more thereof. The support structure may be made of a heat conducting material, such as a metal, to enhance the transfer of heat to or from the catalyst.

The catalyst may be supported on a fin assembly comprising one or more fins positioned within the process microchannels. The fins project from the fin support into the interior of the process microchannel. The fins may extend to and contact the interior surface of upper wall of process microchannel. Fin channels between the fins provide passageways for reactant and product to flow through the process microchannel parallel to its length. Each of the fins has an exterior surface on each of its sides. The exterior surface provides a support base for the catalyst. The reactants may flow through the fin channels, contact the catalyst supported on the exterior surface of the fins, and react to form product. Each of the fins may have a height ranging from about 0.02 mm up to the height of the process microchannel, or from about 0.02 to about 10 mm, or from about 0.02 to about 5 mm, or from about 0.02 to about 2 mm. The width of each fin may range from about 0.02 to about 5 mm, or from about 0.02 to about 2 mm, or about 0.02 to about 1 mm. The length of each fin may be of any length up to the length of the process microchannel, or up to about 10 m, or about 0.5 to about 10 m, or about 0.5 to about 6 m, or about 0.5 to about 3 m. The gap between each of the fins may be of any value and may range from about 0.02 to about 5 mm, or from about 0.02 to about 2 mm, or from about 0.02 to about 1 mm. The number of fins in the process microchannel may range from about 1 to about 50 fins per centimeter of width of the process microchannel, or from about 1 to about 30 fins per centimeter, or from about 1 to about 10 fins per centimeter, or from about 1 to about 5 fins per centimeter, or from about 1 to about 3 fins per centimeter. Each of the fins may have a cross-section in the form of a rectangle or square. When viewed along its length, each fin may be straight, tapered or have a serpentine configuration. The fin assembly may be made of any material that provides sufficient strength, dimensional stability and heat transfer characteristics to permit operation for which the process microchannel is intended. These materials include: steel (e.g., stainless steel, carbon steel, and the like); aluminum; titanium; nickel; platinum; rhodium; copper; chromium; alloys of any of the foregoing metals; monel; inconel; brass; polymers (e.g., thermoset resins); ceramics; glass; quartz; silicon; or a combination of two or more thereof. The fin assembly may be made of an $Al_2O_3$ or a $Cr_2O_3$ forming material wherein a layer of $Al_2O_3$ or a $Cr_2O_3$ forms on the surface of the fin assembly when the fin assembly is heat treated in air. The fin assembly may be made of an alloy comprising Fe, Cr, Al and Y, or an alloy comprising Ni, Cr and Fe.

The catalyst may be supported on one or more corrugated inserts positioned in slots within the microchannel reactor. The slots may comprise microchannels, and have the dimensions indicated above as being microchannels. Alternatively, the slots may have dimensions that would make them larger than microchannels. The process microchannels of the microchannel reactor may comprise the slots, or may be positioned within the corrugated inserts and/or formed by openings between the interior sidewalls of the slots and the inserts. Each of the corrugated inserts may have a height ranging from about 0.02 mm up to the height of the slot, or from about 0.02 to about 10 mm, or from about 0.02 to about 5 mm, or from about 0.02 to about 2 mm. Each of the corrugated inserts may have a width ranging from about 0.02 mm up to the width of the slot, or from about 0.02 to about 10 mm, or from about 0.02 to about 5 mm, or from about 0.02 to about 2 mm. The length of each corrugated insert may be of any length up to the length of the slot, or up to about 10 m, or about 0.5 to about 10 m, or about 0.5 to about 6 m, or about 0.5 to about 3 m. The corrugated inserts may be made of any material that provides sufficient strength, dimensional stability and heat transfer characteristics to permit operation for which the microchannel reactor is intended. These materials include: steel (e.g., stainless steel, carbon steel, and the like); aluminum; titanium; nickel; platinum; rhodium; copper; chromium; alloys of any of the foregoing metals; monel; inconel; brass; polymers (e.g., thermoset resins); ceramics; glass; quartz; silicon; or a combination of two or more thereof. The corrugated inserts may be made of an alloy that forms a layer of $Al_2O_3$ or $Cr_2O_3$ on the surface of the inserts when heat treated in air. The corrugated inserts may be made of an alloy comprising Fe, Cr, Al and Y, or an alloy comprising Ni, Cr and Fe.

The catalyst may be directly washcoated or grown from solution on the interior walls of the process microchannels and/or on one or more of the above-described catalyst support structures. The catalyst may be in the form of a single piece of porous contiguous material, or many pieces in physical contact. The catalyst may comprise a contiguous material and have a contiguous porosity such that molecules can diffuse through the catalyst. In this embodiment, the fluids may flow through the catalyst rather than around it. The cross-sectional area of the catalyst may occupy from about 1 to about 99%, or about 10 to about 95% of the cross-sectional area of the process microchannels.

In some preferred embodiments, the FT reaction may be conducted using one or any combination of the following conditions:

The contact time of the reactants with the Fischer-Tropsch catalyst may range up to about 2000 milliseconds (ms), or in the range from about 10 to about 2000 ms, or from about 10 ms to about 1000 ms, or about 20 ms to about 500 ms, or from about 200 to about 400 ms, or from about 240 to about 350 ms.

The space velocity (or gas hourly space velocity (GHSV)) for the flow of fluid in the Fischer-Tropsch microchannels may be at least about 1000 $hr^{-1}$ (normal liters of feed/hour/liter of volume within the process microchannels), or from about 1000 to about 1,000,000 $hr^{-1}$, or from about 5000 to about 20,000 $hr^{-1}$.

The pressure within the Fischer-Tropsch process microchannels may be up to about 100 atmospheres, or in the range from about 1 to about 100 atmospheres, or from about 1 to about 75 atmospheres, or from about 2 to about 40 atmospheres, or from about 2 to about 10 atmospheres, or from about 10 to about 50 atmospheres, or from about 20 to about 30 atmospheres.

The pressure drop of fluids as they flow in the Fischer-Tropsch process microchannels may range up to about 30 atmospheres per meter of length of channel (atm/m), or up to about 25 atm/m, or up to about 20 atm/m. The pressure drop may be in the range from about 10 to about 20 atm/m.

The Reynolds Number for the flow of fluid in the Fischer-Tropsch process microchannels may be in the range of about 10 to about 4000, or about 100 to about 2000.

The average temperature in the Fischer-Tropsch process microchannels may be in the range from about 150 to about 300° C., or in the range from about 175 to about 240° C., of in the range from about 190 to about 230° C., or from about 195 to about 225° C.

The heat exchange fluid entering the heat exchange channels of the microchannel reactor may be at a temperature in the range of about 100° C. to about 400° C., or about 200° C. to about 300° C. The heat exchange fluid exiting the heat exchange channels may be at a temperature in the range of about 150° C. to about 450° C., or about 200° C. to about 350° C. The residence time of the heat exchange fluid in the heat exchange channels may range from about 1 to about 2000 ms, or about 10 to about 500 ms. The pressure drop for the heat exchange fluid as it flows through the heat exchange channels may range up to about 10 atm/m, or from about 1 to about 10 atm/m, or from about 3 to about 7 atm/m, or about 5 atm/m. The heat exchange fluid may be in the form of a vapor, a liquid, or a mixture of vapor and liquid. The Reynolds Number for the flow of the heat exchange fluid in heat exchange channels may be from about 10 to about 4000, or about 100 to about 2000.

The heat exchange fluid used in the heat exchange channels in the microchannel reactor may be any heat exchange fluid suitable for cooling a Fischer-Tropsch exothermic reaction. These may include air, steam, liquid water, gaseous nitrogen, other gases including inert gases, carbon monoxide, oils such as mineral oil, and heat exchange fluids such as Dowtherm A and Therminol which are available from Dow-Union Carbide.

The heat exchange channels used in the microchannel reactor may comprise process channels wherein an endothermic process is conducted. These heat exchange process channels may be microchannels. Examples of endothermic processes that may be conducted in the heat exchange channels include steam reforming and dehydrogenation reactions. Steam reforming of an alcohol that occurs at a temperature in the range from about 200° C. to about 300° C. is an example of an endothermic process that may be used. The incorporation of a simultaneous endothermic reaction to provide an improved cooling may enable a typical heat flux of roughly an order of magnitude above convective cooling.

The heat exchange fluid may undergo a partial or full phase change as it flows in the heat exchange channels of the microchannel reactor. This phase change may provide additional heat removal from the process microchannels beyond that provided by convective cooling. For a liquid heat exchange fluid being vaporized, the additional heat being transferred from the Fischer-Tropsch process microchannels may result from the latent heat of vaporization required by the heat exchange fluid. In one embodiment, about 50% by weight of the heat exchange fluid may be vaporized, or about 35% by weight may be vaporized, or about 20% by weight may be vaporized, or about 10% by weight, or about 5% by weight may be vaporized, or about 2 to about 3% by weight may be vaporized.

The heat flux for heat exchange in the microchannel reactor may be in the range from about 0.01 to about 500 watts per square centimeter of surface area of the one or more heat transfer walls of the process microchannels ($W/cm^2$) in the microchannel reactor, or in the range from about 0.1 to about 250 $W/cm^2$, or from about 1 to about 125 $W/cm^2$, or from about 1 to about 100 $W/cm^2$, or from about 1 to about 50 $W/cm^2$, or from about 1 to about 25 $W/cm^2$, or from about 1 to about 10 $W/cm^2$. The range may be from about 0.2 to about 5 $W/cm^2$, or about 0.5 to about 3 $W/cm^2$, or from about 1 to about 2 $W/cm^2$.

The control of heat exchange during the Fischer-Tropsch reaction process may be advantageous for controlling selectivity towards the desired product due to the fact that such added cooling may reduce or eliminate the formation of undesired by-products from undesired parallel reactions with higher activation energies.

The pressure within each individual heat exchange channel in the microchannel reactor may be controlled using passive structures (e.g., obstructions), orifices and/or mechanisms upstream of the heat exchange channels or in the channels. By controlling the pressure within each heat exchange channel, the temperature within each heat exchange channel can be controlled. A higher inlet pressure for each heat exchange channel may be used where the passive structures, orifices and/or mechanisms let down the pressure to the desired pressure. By controlling the temperature within each heat exchange channel, the temperature in the Fischer-Tropsch process microchannels can be controlled. Thus, for example, each Fischer-Tropsch process microchannel may be operated at a desired temperature by employing a specific pressure in the heat exchange channel adjacent to or in thermal contact with the process microchannel. This provides the advantage of precisely controlled temperatures for each Fischer-Tropsch process microchannel. The use of precisely controlled temperatures for each Fischer-Tropsch process microchannel provides the advantage of a tailored temperature profile and an overall reduction in the energy requirements for the process.

In a scaled up device, for certain applications, it may be required that the mass of the process fluid be distributed uniformly among the microchannels. Such an application may be when the process fluid is required to be heated or cooled down with adjacent heat exchange channels. The uniform mass flow distribution may be obtained by changing the cross-sectional area from one parallel microchannel to another microchannel. The uniformity of mass flow distribution may be defined by Quality Index Factor (Q-factor) as indicated below. A Q-factor of 0% means absolute uniform distribution.

$$Q = \frac{\dot{m}_{max} - \dot{m}_{min}}{\dot{m}_{max}} \times 100$$

A change in the cross-sectional area may result in a difference in shear stress on the wall. In one embodiment, the Q-factor for the microchannel reactor may be less than about 50%, or less than about 20%, or less than about 5%, or less than about 1%.

The superficial velocity for fluid flowing in the Fischer-Tropsch process microchannels may be at least about 0.01 meters per second (m/s), or at least about 0.1 m/s, or in the range from about 0.01 to about 100 m/s, or in the range from about 0.01 to about 10 m/s, or in the range from about 0.1 to about 10 m/s, or in the range from about 1 to about 100 m/s, or in the range from about 1 to about 10 m/s.

The free stream velocity for fluid flowing in the Fischer-Tropsch process microchannels may be at least about 0.001 m/s, or at least about 0.01 m/s, or in the range from about 0.001 to about 200 m/s, or in the range from about 0.01 to about 100 m/s, or in the range from about 0.01 to about 200 m/s.

The conversion of CO from the fresh synthesis gas in the reactant mixture may be about 70% or higher, or about 75% or higher, or about 80% or higher, or about 90% or higher, or about 91% or higher, or about 92% or higher, or from about 88% to about 95%, or from about 90% to about 94%, or from about 91% to about 93%. The one-pass conversion of CO for the CO in the reactant mixture (i.e., fresh synthesis gas plus recycled tail gas) may be in the range from about 65% to about 90%, or from about 70% to about 85%.

The selectivity to methane in the Fischer-Tropsch (FT) product may be in the range from about 0.01 to about 10%, or about 1% to about 5%, or about 1% to about 10%, or about 3% to about 9%, or about 4% to about 8%.

In one preferred process for conducting a Fischer-Tropsch reaction, a reactant mixture in a microchannel reactor flows in contact with a catalyst to form a product comprising at least one higher molecular weight hydrocarbon product. Preferably, the catalyst is derived from a catalyst precursor comprising cobalt, optionally a promoter such as Pd, Pt, Rh, Ru, Re, Ir, Au, Ag and/or Os, and a surface modified support, wherein the surface of the support is modified by being treated with titania, zirconia, magnesia, chromia, alumina, silica, or a mixture of two or more thereof. The product further comprises a tail gas, and at least part of the tail gas can be separated from the higher molecular weight hydrocarbon product and combined with fresh synthesis gas to form a reactant mixture, the volumetric ratio of the fresh synthesis gas to the tail gas in the reactant mixture being in the range from about 1:1 to about 10:1, or from about 1:1 to about 8:1, or from about 1:1 to about 6:1, or from about 1:1 to about 4:1, or from about 3:2 to about 7:3, or about 2:1; the reactant mixture comprising $H_2$ and CO, the mole ratio of $H_2$ to CO in the reactant mixture based on the concentration of CO in the fresh synthesis gas being in the range from about 1.4:1 to about 2:1 or from about 1.5:1 to about 2.1:1, or from about 1.6:1 to about 2:1, or from about 1.7:1 to 1.9:1. Preferably, the conversion of CO for the fresh synthesis gas in the reactant mixture is at least about 70%, or at least about 75%, or at least about 80%, or at least about 85%, or at least about 90%; and the selectivity to methane in the product is in the range from about 0.01 to 10%, or from about 1% to about 10%, or from about 1% to about 5%, or from about 3% to about 9%, or from about 4% to about 8%.

The one-pass conversion of CO for the CO in the reactant mixture (i.e., CO from the fresh synthesis gas plus CO from the tail gas can be combined with the fresh synthesis gas) may preferably be in the range from about 70% to about 90%, or from about 70% to about 85%, or from about 70% to about 80%.

The CO conversion for the CO in fresh synthesis gas may be in the range from about 88% to about 95%, or from about 90% to about 94%, or from about 91 to about 93%.

The FT product may comprise one or more hydrocarbons boiling at a temperature of at least about 30° C. at atmospheric pressure. The higher molecular weight aliphatic hydrocarbon product may comprise one or more hydrocarbons boiling above a temperature of about 175° C. at atmospheric pressure. The hydrocarbon product may comprise one or more paraffins and/or one or more olefins of about 5 to about 100 carbon atoms. The product may comprise one or more olefins, one or more normal paraffins, one or more isoparaffins, or a mixture of two or more thereof. The product may be further processed using separation, fractionation, hydrocracking, hydroisomerizing, dewaxing, or a combination of two or more thereof. The FT product may be further processed to form an oil of lubricating viscosity or a middle distillate fuel. The product may be further processed to form a fuel.

The product may comprise a higher molecular weight hydrocarbon product, $H_2O$ and $H_2$, the $H_2O$ partial pressure for the product being in the range from about 3 to about 10 bar, the $H_2O/H_2$ molar ratio for the product being in the range from about 1:1 to about 5:1, and the conversion of CO based on the total reactant mixture fed to the reactor (i.e., the sum of fresh synthesis gas and recycle tail gas) being in the range from about 70 to about 80%, or about 70 to about 85%, or from about 80 to about 85%, or from about 82 to about 83%.

The Fischer-Tropsch product formed in the microchannel reactor may comprise a gaseous product fraction and a liquid product fraction. The gaseous product fraction may include hydrocarbons boiling below about 350° C. at atmospheric pressure (e.g., tail gases through middle distillates). The liquid product fraction (the condensate fraction) may include hydrocarbons boiling above about 350° C. (e.g., vacuum gas oil through heavy paraffins).

The Fischer-Tropsch product fraction boiling below about 350° C. may be separated into a tail gas fraction and a condensate fraction, e.g., normal paraffins of about 5 to about 20 carbon atoms and higher boiling hydrocarbons, using, for example, a high pressure and/or lower temperature vapor-liquid separator, or low pressure separators or a combination of separators. The fraction boiling above about 350° C. (the condensate fraction) may be separated into a wax fraction boiling in the range of about 350° C. to about 650° C. after removing one or more fractions boiling above about 650° C. The wax fraction may contain linear paraffins of about 20 to about 50 carbon atoms with relatively small amounts of higher boiling branched paraffins. The separation may be effected using fractional distillation.

The Fischer-Tropsch product formed in the microchannel reactor may include methane, wax and other heavy high molecular weight products. The product may include olefins such as ethylene, normal and iso-paraffins, and combinations thereof. These may include hydrocarbons in the distillate fuel ranges, including the jet or diesel fuel ranges.

Branching may be advantageous in a number of end-uses, particularly when increased octane values and/or decreased pour points are desired. The degree of isomerization may be greater than about 1 mole of isoparaffin per mole of n-paraffin, or about 3 moles of isoparaffin per mole of n-paraffin. When used in a diesel fuel composition, the product may comprise a hydrocarbon mixture having a cetane number of at least about 60.

The Fischer-Tropsch product may be further processed to form a lubricating base oil or diesel fuel. For example, the product made in the microchannel reactor may be hydrocracked and then subjected to distillation and/or catalytic isomerization to provide a lubricating base oil, diesel fuel, aviation fuel, and the like. The Fischer-Tropsch product may be hydroisomerized using the process disclosed in U.S. Pat. No. 6,103,099 or 6,180,575; hydrocracked and hydroisomerized using the process disclosed in U.S. Pat. No. 4,943,672 or 6,096,940; dewaxed using the process disclosed in U.S. Pat. No. 5,882,505; or hydroisomerized and dewaxed using the process disclosed in U.S. Pat. Nos. 6,013,171, 6,080,301 or 6,165,949. These patents are incorporated herein by reference for their disclosures of processes for treating Fischer-Tropsch synthesized hydrocarbons and the resulting products made from such processes.

The hydrocracking reaction may be conducted in a hydrocracking microchannel reactor and may involve a reaction between hydrogen and the Fischer-Tropsch product flowing from the microchannel reactor, or one or more hydrocarbons separated from the Fischer-Tropsch product (e.g., one or more liquid or wax Fischer-Tropsch hydrocarbons). The Fischer-Tropsch product may comprise one or more long chain hydrocarbons. In the hydrocracking process, a desired diesel fraction, for example, may be increased by cracking a $C_{23+}$ fraction to mid range carbon numbers of $C_{12}$ to $C_{22}$. A wax fraction produced from the Fischer-Tropsch microchannel reactor may be fed to the hydrocracking microchannel reactor with excess hydrogen for a triple phase reaction. Under reaction conditions at elevated temperatures and pressures, a fraction of the liquid feed may convert to a gas phase, while the remaining liquid fraction may flow along the catalyst. In conventional hydrocracking systems, a liquid stream forms. The use of a microchannel reactor for the hydrocracking reaction enables unique advantages on a number of fronts. These may include kinetics, pressure drop, heat transfer, and mass transfer.

The Fischer-Tropsch hydrocarbon products that may be hydrocracked in the hydrocracking microchannel reactor may comprise any hydrocarbon that may be hydrocracked. These may include hydrocarbons that contain one or more C—C bonds capable of being broken in a hydrocracking process. The hydrocarbons that may be hydrocracked may include saturated aliphatic compounds (e.g., alkanes), unsaturated aliphatic compounds (e.g., alkenes, alkynes), hydrocarbyl (e.g., alkyl) substituted aromatic compounds, hydrocarbylene (e.g., alkylene) substituted aromatic compounds, and the like.

The feed composition for the hydrocracking microchannel reactor may include one or more diluent materials. Examples of such diluents may include non-reactive hydrocarbon diluents, and the like. The diluent concentration may be in the range from zero to about 99% by weight based on the weight of the Fischer-Tropsch product, or from zero to about 75% by weight, or from zero to about 50% by weight. The diluents may be used to reduce the viscosity of viscous liquid reactants. The viscosity of the feed composition in the hydrocracking microchannel reactor may be in the range from about 0.001 to about 1 centipoise, or from about 0.01 to about 1 centipoise, or from about 0.1 to about 1 centipoise.

The ratio of hydrogen to Fischer-Tropsch product in the feed composition entering the hydrocracking microchannel reactor may be in the range from about 10 to about 2000 standard cubic centimeters (sccm) of hydrogen per cubic centimeter (ccm) of Fischer-Tropsch product, or from about 100 to about 1800 sccm/ccm, or from about 350 to about 1200 sccm/ccm. The hydrogen feed may further comprise water, methane, carbon dioxide, carbon monoxide and/or nitrogen.

The $H_2$ in the hydrogen feed may be derived from another process such as a steam reforming process (product stream with $H_2/CO$ mole ratio of about 3), a partial oxidation process (product stream with $H_2/CO$ mole ration of about 2), an autothermal reforming process (product stream with $H_2/CO$ mole ratio of about 2.5), a $CO_2$ reforming process (product stream with $H_2/CO$ mole ratio of about 1), a coal gassification process (product stream with $H_2/CO$ mole ratio of about 1), and combinations thereof. With each of these feed streams the $H_2$ may be separated from the remaining ingredients using conventional techniques such as membranes or adsorption.

The hydrocracked Fischer-Tropsch product may comprise a middle distillate fraction boiling in the range of about 260-700° F. (127-371° C.). The term "middle distillate" is intended to include the diesel, jet fuel and kerosene boiling range fractions. The terms "kerosene" and "jet fuel" boiling range are intended to refer to a temperature range of 260-550° F. (127-288° C.) and "diesel" boiling range is intended to refer to hydrocarbon boiling points between about 260 to about 700° F. (127-371° C.). The hydrocracked Fischer-Tropsch product may comprise a gasoline or naphtha fraction. These may be considered to be the $C_5$ to 400° F. (204° C.) endpoint fractions.

Figure 1:
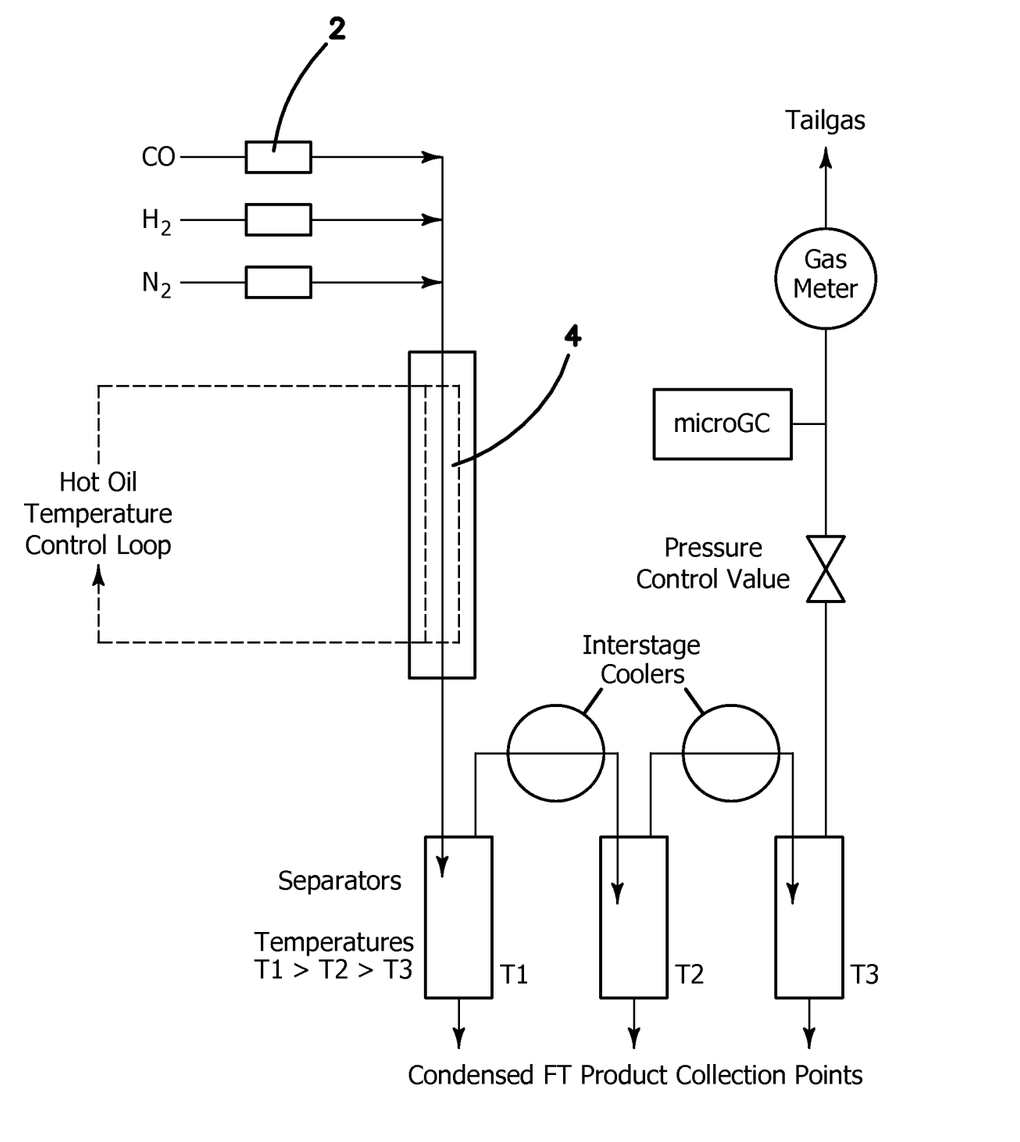
FIG. 1 is a schematic view of an FT test reactor.

A schematic view of an FT test reactor system is shown in FIG. 1. As shown in the FIGURE, CO, $H_2$, and $N_2$ can be metered through mass controllers 2 and the gases are reacted in microchannel reactor 4 and the products pass into a separator or separators. The product composition can be analyzed by gas chromatography such as the microGC shown in FIG. 1.

FIG. 1 shows three points for condensing products. There is no limit to the number of condensing stages that could be used, including just two stages or even a single stage for separating an aqueous stage or a combined aqueous solution from multiple condensers. In the context of the present invention, a first condensed aqueous stream is typically condensed at a higher temperature than a second aqueous stream. With reference to the FIG. 1, a first aqueous stream could be collected from the condenser at T1 and a second aqueous stream could be collected from the condenser at T2. Alternatively, it is possible that the aqueous fractions from T1 and T2 could be combined into a first aqueous stream while the fraction collected from a condenser at T3 could be sent to a water treatment facility. It should be understood that the separate uses for differing aqueous fractions is not required in every embodiment of the invention, since, in some embodiments, any or all of the aqueous fractions could be used for fracking.

In some preferred embodiments, all water is collected in a single separator and the full flow is subjected to stripping, prior to subsequent use and/or biological treatment.

In the case of a relatively hot (T1) and cold (T2) separation, the liquid separated at the higher temperature will contain less carbon than the cold separator. As a result, it may be necessary to strip only the cold separator water. The hot separator water and stripped cold separator water could then used and/or sent to biological treatment.

What is claimed:

1. A method of fracking, comprising:
   creating water in a Fischer-Tropsch (FT) process to form created water;
   storing the created water in a location close to a fracking site;
   injecting the created water in a well at the fracking site;
   wherein a product stream from the FT process is separated into a first aqueous stream and a second aqueous stream; wherein the first aqueous stream contains a lower concentration of carbon than the second aqueous stream; and wherein water from the first aqueous stream is stored and injected into the well at the fracking site.

2. The method of claim 1 wherein the FT process is conducted within 1.6 km of the fracking site.

3. The method of claim 1 further comprising subjecting the first aqueous stream to a stripping operation where a gas is passed through the first aqueous stream.

4. The method of claim 1 wherein at least a portion of the second aqueous stream is reacted in a steam reforming reaction or an autothermal reforming reaction.

5. The method of claim 1 wherein the created water that is injected into the well has a concentration of methanol that is more than 10 times greater than any other alcohol.

6. The method of claim 1 wherein the FT process is conducted in the presence of a FT catalyst at a contact time of less than 1 second.

7. The method of claim 6 wherein the FT process is conducted in a microchannel.

8. The method of claim 6 further comprising adding a base to the created water to increase pH prior to injecting the created water in the well at the fracking site.

9. The method of claim 6 further comprising adding particulates to the created water prior to injecting the created water in the well at the fracking site.

10. A method of treating water created in a Fischer-Tropsch process, comprising:
    conducting a Fischer-Tropsch process to form a product stream;
    separating the product stream into an aqueous stream and a hydrocarbon product stream;
    subjecting the aqueous stream to a stripping operation where a gas is passed through the aqueous stream and thereby producing a stripped aqueous stream; and
    using the stripped aqueous stream in a secondary process comprising adding particulates to water from the stripped aqueous stream and then injecting the water into a well at a fracking site.

11. The method of claim 10, comprising:
    separating the product stream into a first aqueous stream and a second aqueous stream;
    wherein the first aqueous stream contains a lower concentration of carbon than the second aqueous stream;
    subjecting the second aqueous stream to a stripping operation where a gas is passed through the second aqueous stream and thereby producing a second stripped stream.

12. The method of claim 1 wherein a product stream from the FT process is separated into a first aqueous stream and a second aqueous stream; wherein the second aqueous stream is subjected to stripping with a gas.

13. The method of claim 12 wherein water from the first aqueous stream and/or second aqueous stream is stored and injected into the well at the fracking site.

14. The method of claim 10, comprising:
    separating the product stream into a first aqueous stream and a second aqueous stream;
    wherein the first aqueous stream contains a lower concentration of carbon than the second aqueous stream;
    subjecting the first aqueous stream to a stripping operation where a gas is passed through the first aqueous stream and thereby producing a first stripped stream;
    using the stripped stream in the secondary process comprising adding particulates to water from the stripped aqueous stream and then injecting the water into a well at a fracking site; and
    passing the second aqueous stream to a waste treatment facility.

15. The method of claim 14 wherein the waste treatment facility comprises a biological treatment.

16. The method of claim 14 where the gas is selected from the group consisting of steam, air, N2, tail gas, natural gas, and combinations thereof.

* * * * *